(12) United States Patent
Legner

(10) Patent No.: US 8,756,931 B2
(45) Date of Patent: *Jun. 24, 2014

(54) DEVICE FOR ADJUSTING THE STROKE VOLUME OF HYDRAULIC PISTON MACHINES

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1118 days.

This patent is subject to a terminal disclaimer.

(21) Appl. No.: 12/679,522

(22) PCT Filed: Aug. 15, 2008

(86) PCT No.: PCT/EP2008/060762
§ 371 (c)(1),
(2), (4) Date: Mar. 23, 2010

(87) PCT Pub. No.: WO2009/047040
PCT Pub. Date: Apr. 16, 2009

(65) Prior Publication Data
US 2010/0209260 A1    Aug. 19, 2010

(30) Foreign Application Priority Data
Oct. 2, 2007  (DE) .................. 10 2007 047 195

(51) Int. Cl.
*F16D 39/00*   (2006.01)
(52) U.S. Cl.
USPC .......................................................... 60/492
(58) Field of Classification Search
USPC ............... 74/733.1; 60/491, 492, 452; 475/72
See application file for complete search history.

(56) References Cited

U.S. PATENT DOCUMENTS

| 2,583,656 | A |   | 1/1952  | Lay |
| 2,808,737 | A |   | 10/1957 | Bullard, III |
| 3,023,638 | A |   | 3/1962  | Westbury et al. |
| 3,107,490 | A | * | 10/1963 | Cooper et al. ................. 60/443 |
| 3,126,707 | A | * | 3/1964  | Hann et al. ..................... 60/389 |
| 3,204,486 | A |   | 9/1965  | Lalio |
| 3,212,358 | A |   | 10/1965 | Lalio |
| 3,371,479 | A | * | 3/1968  | Yapp et al. ...................... 60/431 |
| 3,508,401 | A | * | 4/1970  | Aplin ............................. 60/389 |
| 3,561,212 | A | * | 2/1971  | Pinkerton et al. .............. 60/489 |
| 3,580,107 | A | * | 5/1971  | Orshansky, Jr. ................ 475/78 |
| 3,601,981 | A |   | 8/1971  | Ifield |
| 3,606,755 | A | * | 9/1971  | Connett ......................... 60/446 |
| 3,626,787 | A |   | 12/1971 | Singer |

(Continued)

FOREIGN PATENT DOCUMENTS

| AT | 197 650 B | 10/1957 |
| DE | 1 069 978 | 11/1959 |

(Continued)

*Primary Examiner* — Edward Look
*Assistant Examiner* — Michael Quandt
(74) *Attorney, Agent, or Firm* — Davis & Bujold, PLLC; Michael J. Bujold

(57) ABSTRACT

A device for adjusting the swept volume of a first piston machine (1), of transverse axis design, and a second piston machine (2), of transverse axis design. The device including a common component (4), via which the swept volumes can be adjusted, and a valve (12) which, when a maximum pressure level in the working lines (3) is exceeded, can be rerouted in such a way that the common component (4) reroutes the swept volume in a direction toward the lower power input.

11 Claims, 2 Drawing Sheets

(56) References Cited

U.S. PATENT DOCUMENTS

| | | | |
|---|---|---|---|
| 3,714,845 A | 2/1973 | Mooney, Jr. | |
| 3,834,164 A * | 9/1974 | Ritter | 60/492 |
| 3,886,742 A * | 6/1975 | Johnson | 60/488 |
| 4,019,404 A | 4/1977 | Schauer | |
| 4,121,479 A | 10/1978 | Schauer | |
| 4,434,681 A | 3/1984 | Friedrich et al. | |
| 4,446,756 A | 5/1984 | Hagin et al. | |
| 4,508,281 A * | 4/1985 | Plater | 242/414 |
| 4,548,098 A * | 10/1985 | Besson et al. | 475/32 |
| 4,563,914 A | 1/1986 | Miller | |
| 4,776,233 A | 10/1988 | Kita et al. | |
| 4,813,306 A | 3/1989 | Kita et al. | |
| 4,901,529 A * | 2/1990 | Iino et al. | 60/489 |
| 4,976,664 A | 12/1990 | Hagin et al. | |
| 5,071,391 A | 12/1991 | Kita | |
| 5,421,790 A | 6/1995 | Lasoen | |
| 5,447,029 A * | 9/1995 | Swick et al. | 60/492 |
| 5,561,979 A * | 10/1996 | Coutant et al. | 60/448 |
| 5,575,735 A * | 11/1996 | Coutant et al. | 475/72 |
| 5,643,122 A | 7/1997 | Fredriksen | |
| 5,667,452 A | 9/1997 | Coutant | |
| 5,766,107 A | 6/1998 | Englisch | |
| 5,868,640 A | 2/1999 | Coutant | |
| 5,890,981 A | 4/1999 | Coutant et al. | |
| 6,029,542 A | 2/2000 | Wontner | |
| 6,056,661 A | 5/2000 | Schmidt | |
| 6,062,022 A * | 5/2000 | Folsom et al. | 60/438 |
| 6,276,134 B1 * | 8/2001 | Matsuyama et al. | 60/425 |
| 6,358,174 B1 * | 3/2002 | Folsom et al. | 475/72 |
| 6,485,387 B1 | 11/2002 | Goodnight et al. | |
| 6,530,855 B1 * | 3/2003 | Folsom et al. | 475/72 |
| 6,592,485 B2 | 7/2003 | Otten et al. | |
| 6,622,594 B2 * | 9/2003 | Ikari et al. | 74/733.1 |
| 6,761,658 B1 | 7/2004 | Stettler, Jr. | |
| 6,857,986 B2 * | 2/2005 | Ikari et al. | 477/64 |
| 6,997,838 B2 * | 2/2006 | Folsom et al. | 475/72 |
| 7,097,583 B2 | 8/2006 | Lauinger et al. | |
| 7,354,368 B2 | 4/2008 | Pollman | |
| 7,448,976 B2 | 11/2008 | Hiraki et al. | |
| 7,926,267 B2 * | 4/2011 | Koehler et al. | 60/492 |
| 2002/0042319 A1 | 4/2002 | Otten et al. | |
| 2003/0089107 A1 | 5/2003 | Tani | |
| 2003/0150662 A1 | 8/2003 | Tani | |
| 2003/0166430 A1 | 9/2003 | Folsom et al. | |
| 2004/0242357 A1 | 12/2004 | Ishizaki | |
| 2006/0094554 A1 | 5/2006 | Schmidt | |
| 2006/0276291 A1 | 12/2006 | Fabry et al. | |
| 2007/0277520 A1 | 12/2007 | Gollner | |
| 2007/0281815 A1 | 12/2007 | Gollner | |
| 2008/0085801 A1 | 4/2008 | Sedoni et al. | |
| 2008/0103006 A1 | 5/2008 | Pollman et al. | |
| 2008/0214349 A1 | 9/2008 | Liebherr et al. | |
| 2008/0214351 A1 | 9/2008 | Katayama et al. | |
| 2009/0270212 A1 | 10/2009 | Ueda et al. | |
| 2010/0056318 A1 | 3/2010 | Glockler | |

FOREIGN PATENT DOCUMENTS

| | | |
|---|---|---|
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 a1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1 197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

DEVICE FOR ADJUSTING THE STROKE VOLUME OF HYDRAULIC PISTON MACHINES

This application is a National Stage completion of PCT/EP2008/060762 filed Aug. 15, 2008, which claims priority from German patent application serial no. 10 2007 047 195.7 filed Oct. 2, 2007.

FIELD OF THE INVENTION

The invention concerns a device for adjusting the swept volume of hydraulic piston machines.

BACKGROUND OF THE INVENTION

Hydraulic piston machines are utilized, for example, in hydrostatic mechanical power split transmissions for the hydraulic power branch to vary continuously the transmission ratio. For this purpose, hydraulic piston machines need adjusting devices by means of which the swept volume of the piston machines is adjusted.

DE 42 06 023 A1 discloses a continuously variable hydrostatic mechanical power split transmission comprising hydraulic piston machines and adjusting devices by means of which the piston machines can be continuously adjusted. The adjusting device comprises control elements by means of which the piston machines can be controlled. In order to protect the system from overload, the adjusting device is provided with a pressure relief valve by means of which the maximum pressure can be limited. When the pressure relief valve is activated, the energy is converted into heat which must be released by means of a radiator.

SUMMARY OF THE INVENTION

The object of the invention is to create a device for adjusting the swept volume of hydraulic piston machines which is of simple design and protects the system from overheating.

The object is attained from a generic adjusting device which also has the characteristics of the main claim.

The adjusting device comprises a first and a second piston machine configured of transverse axis design. Piston machines of transverse axis design are characterized by their very good overall efficiencies. Both piston machines are positioned adjacent to each other and comprise a common component, a so-called joke, by means of which the swept volume of both piston machines can be jointly adjusted. The piston machines comprise working lines via which the two piston machines are mutually connected. The piston machines form, in this way, a so-called closed circuit. The common component for adjusting the swept volume of hydraulic piston machines is arranged in such a manner that, in the first position of the common component, the first hydraulic piston machine is adjusted to a small or zero swept volume and the second hydraulic piston machine is adjusted to a large or maximum swept volume. In this operating state, the first hydraulic piston machine functions as a pump, for example, and conveys the pressurizing medium toward the second piston machine which functions as a motor. In another operating state, the second piston machine functions as a pump and the first piston machine functions as a motor. If the common component is adjusted from its first position in a direction toward the second position, the swept volume of the first piston machine, for example the pump, is increased and, at the same time, the swept volume of the second piston machine, for example the motor, is decreased. When the common component is operated in its second position, the first piston machine is at its maximum swept volume and thus conveys a maximum volume flow when it is operated as a pump, while the second piston machine is at its minimum swept volume and thus generates a very high output speed when it is operated as a motor. The common component can be adjusted, for example by means of a hydraulic cylinder, from a first position in a direction toward the second position or from a second position in a direction toward a first position. In this way, by means of a manual input device, for example by means of an accelerator pedal which manually or electrically controls a valve, a driver of a vehicle can forward the driver's request to the devices for adjusting the common component whereby the common component is adjusted by dependence upon the driver's request and, consequently, by dependence on actuation of the manual input. If the driver requests a higher output speed in the second piston machine, then the common component is adjusted in direction toward the second position. If the driver requests a lower output speed, then the common component is adjusted in a direction toward the first position. If there in an increase in driving resistance, it is possible that this may cause a permissible pressure in the working lines, between the first and second piston machines, to be exceeded.

According to the invention, when a predefined pressure level is exceeded, the common component is adjusted in a direction toward the first position whereby the first piston machine, for example the pump, is adjusted in a direction toward a smaller swept volume, and the second piston machine, for example the motor, is adjusted in direction toward a larger swept volume, whereby the pressure in the working lines drops. This predefined pressure level is below a maximum permissible pressure level at which pressure relief valves open, whereby overheating of the system is prevented since the energy, via the pressure relief valves, is not converted into heat.

Another embodiment of the invention provides the option of superimposing the current pressure level in the working lines on another input, by means of another manual input, whereby the common component is adjusted in a direction toward the first position already at a low pressure level. In this way, it is possible to continuously variably influence the maximum permissible pressure. If a simply operating hydraulic cylinder is utilized, which is adjusted by means of a spring in its starting position and is connected to the common component in its first position, by pressurizing this hydraulic cylinder with the pressure of a pressurizing medium source this makes possible to move the common component from the first position in a direction toward the second position. If the hydraulic cylinder is connected to a pressurizing medium reservoir, the common component moves back in a direction toward the first position. The manual input device can consist of another valve, which connects the pressurizing medium cylinder to the pressurizing medium source or to the pressurizing medium reservoir dependent upon the driver's request, and thus determines the position of the common component, whereby the output speed of the piston machine is established. A valve is arranged between this additional valve and the hydraulic cylinder, which connects the pressurizing medium coming from the additional valve with the hydraulic cylinder in its basic position and blocks the pressurizing medium coming from the additional valve and connects the hydraulic cylinder to the pressurizing medium reservoir. When a pressure level that is above a predefined pressure level is detected in the working lines, the additional position is activated.

It is thus possible to control the common component, via the additional valve in the sense of a rotational speed control, and to limit the pressure level, via the valve which is positioned between the hydraulic cylinder and the additional valve, by adjusting the common component in a direction toward the first position.

BRIEF DESCRIPTION OF THE DRAWINGS

Additional features are disclosed in more detail below with reference to the figures. In the drawings.

DETAILED DESCRIPTION OF THE PREFERRED EMBODIMENTS

Figure 1:
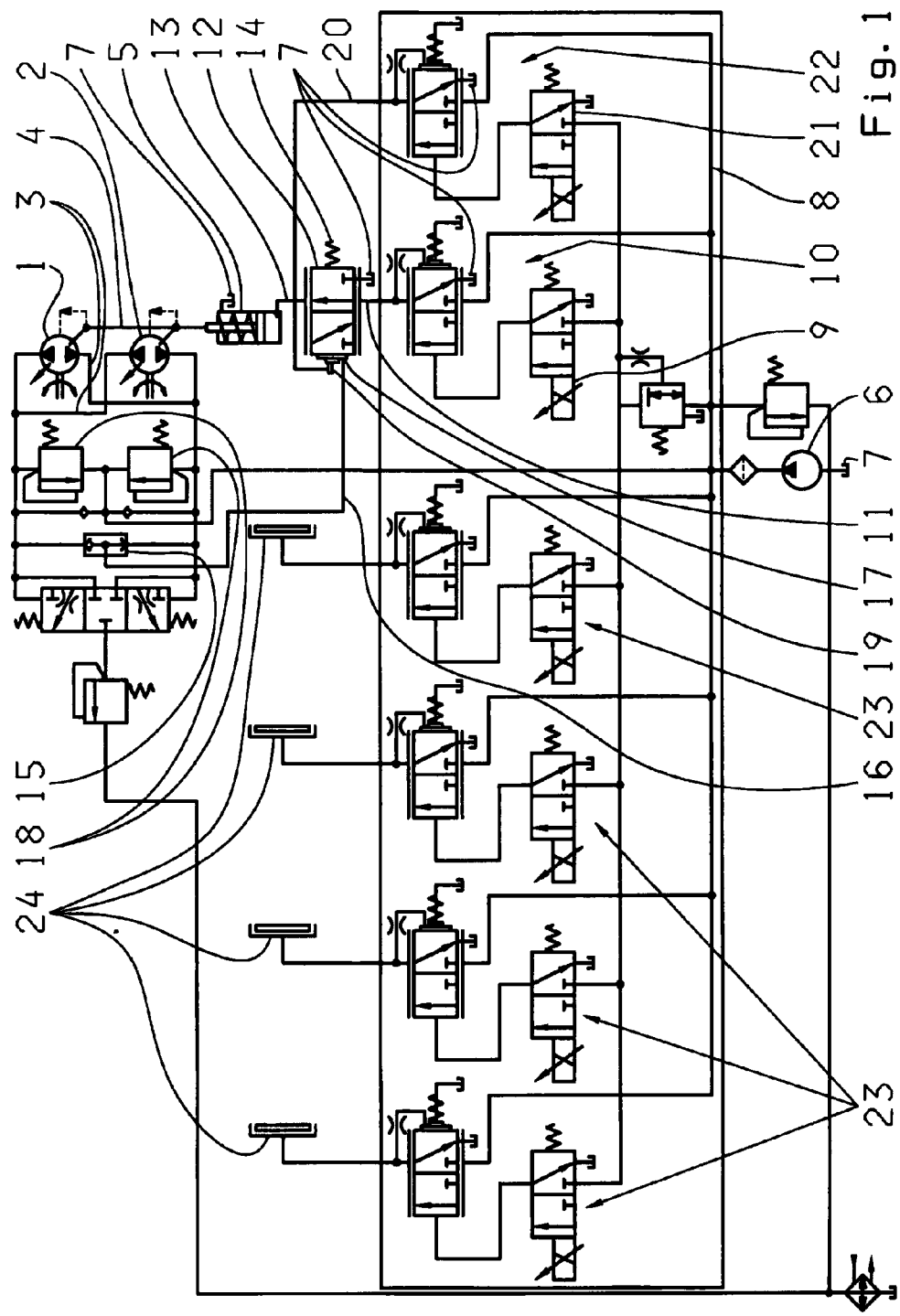
FIG. 1 shows a hydraulic diagram of the adjusting device.
Figure 2:
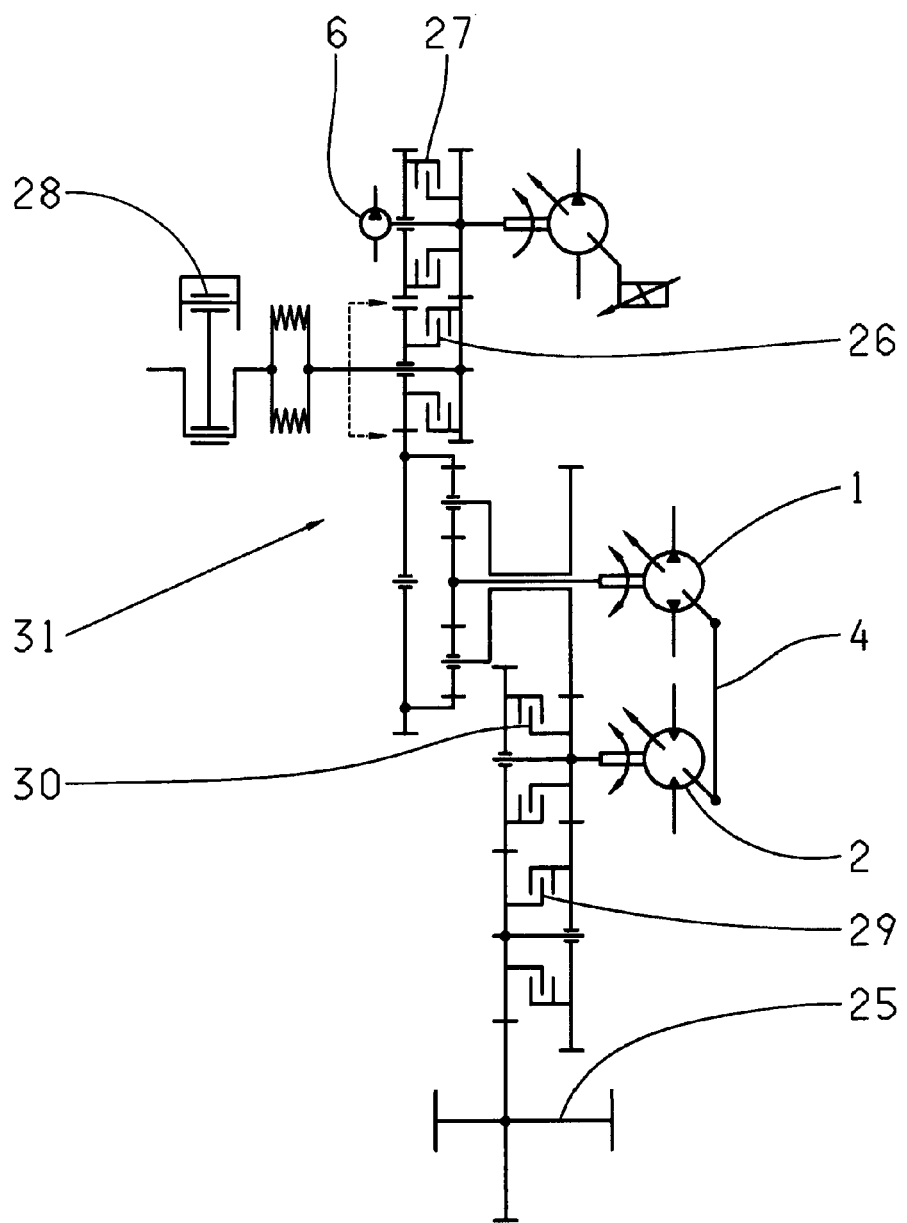
FIG. 2 shows a kinematic diagram of a hydrostatic mechanical power split transmission.

FIG. 1:

The adjusting device comprises a first piston machine 1, of a transverse axis design, which functions as a pump, for example, in an operating condition, and a second piston machine 2, of a transverse axis design, which functions as a motor, for example, in an operating condition. The first piston machine 1 and the second piston machine 2 are connected to each other via working lines 3. The swept volume of the first piston machine 1 and the second piston machine 2 is adjusted via a common component 4. A spring-loaded hydraulic cylinder (a common component adjuster) 5 is connected to the common component 4. When the hydraulic cylinder 5 is in a non-pressurized state, the first piston machine is adjusted to a zero swept volume, which means that the first piston machine 1 does not convey any pressurizing medium when it is driven. When the hydraulic cylinder 5 is in its non-pressurized state, the second piston machine 2 is adjusted to a maximum swept volume. A pressurizing medium source 6 moves the pressurizing medium from a pressurizing medium reservoir 7 into the line 8. If the common component 4 must be adjusted from its first position in a direction toward the second position, while the hydraulic cylinder 5 is in its non-pressurized state, then the valve 9 of the manual input device 10 is rerouted in such a manner that pressurizing medium flows from the line 8 into the line 11. If the valve 12 is in its basic position, then, from the line 11 via the line 13, the pressurizing medium reaches the hydraulic cylinder 5 and adjusts the common component 4 in a direction toward the second position, whereby the swept volume of the first piston machine 1 is increased, the swept volume of the second piston machine 1 is reduced, and pressurizing medium is conveyed, via the working lines 3, from the first piston machine 1 to the second piston machine 2. Via the spring 14, the valve 12 is held in its basic position wherein, via the shuttle valve 15 and via the line 16, the higher pressure in the working lines 3 reaches the circular ring area 17. With the spring 14, the circular ring area 17 is designed in such a way that the valve 12 is rerouted to its second position, below the opening level of the pressure limiting valves 18, whereby the pressurizing medium of line 11 is further prevented from reaching the hydraulic cylinder 5 and connects the hydraulic cylinder 5 to the pressurizing medium reservoir 7, whereby the common component 4 is displaced in a direction toward the first position, whereby the pressure in the working lines 3 is again reduced. The pressure limiting valves 18 remain closed whereby, in that the valve 12 is rerouted below the pressure level of the pressure limiting valves 18, the drive is protected from overheating. Once the pressure in the working lines 3 has again dropped, the valve 12 is again reversed to its original position, and the pressurizing medium of line 11 can again reach the hydraulic cylinder 5. The valve 12 is provided with a circular area 19 which is connected to the line 20. When the valve 21 is activated, via the line 20 and via the valve 21 of the additional manual input device 22, the pressurizing medium from the line 8 reaches the circular area 19. This pressure, which acts on the circular area 19, generates a force that acts on the spring 14 of the valve 12, which is added to the force resulting from the pressure of line 16 which acts on the circular ring area 17. In this way, the pressure of the line 8 can be superimposed on the pressure of line 16, whereby the switchover point of the valve 12 can be continuously variably adjusted by manual input 22, and thus by dependence upon the additional device. The preferred surface ratio, between the circular area 19 and the circular ring area 17, is 3:100, whereby a force, at a maximum control pressure of 16 bar for example, can be applied on the valve 12 which will correspond to a pressure of 533 bar acting on the circular ring area 17. If the adjusting device is utilized in a mobile vehicle, the continuously variable limiting of the high pressure can thus create a continuously variable traction adjustment. The manual input device 10 can thus create a continuously variable speed adjustment. A continuously variable power adjustment can be realized by combining the continuously variable speed adjustment with the continuously variable traction adjustment. If the adjusting device is utilized in a transmission, the pressurizing medium source 6 supplies, in addition to the adjusting devices, the operating devices 23 and the clutches 24.

FIG. 2:

The hydrostatic mechanical power split transmission is provided with a first piston machine 1 and a second piston machine 2, of the kind represented in FIG. 1, whose swept volume can be adjusted via a common component 4. Via a clutch for forward travel 26 or a clutch for reverse travel 27, the output 25 can be connected to the drive 28. The operating ranges may be shifted by means of a clutch 29 and a clutch 30. The summation gear unit 31 sums the mechanical and the hydraulic power branch.

REFERENCE NUMERALS

1 First piston machine
2 Second piston machine
3 Working line
4 Common component
5 Hydraulic cylinder
6 Pressurizing medium source
7 Pressurizing medium reservoir
8 Line
9 Valve
10 Manual input device
11 Line
12 Valve
13 Line
14 Spring
15 Shuttle valve
16 Line
17 Circular ring area
18 Pressure limiting valve
19 Circular area
20 Line
21 Valve
22 Additional manual input device
23 Operating device
24 Clutch
25 Output
26 Clutch for forward travel
27 Clutch for reverse travel 28 Input
29 Clutch
30 Clutch
31 Summation gear

The invention claimed is:

1. A device for adjusting a swept volume of a hydraulic piston machine of a transverse axis design comprising:
   a first piston machine (1) arranged adjacent to a second piston machine (2),
   working lines (3) hydraulically connecting the first and the second piston machines to one another, and
   a common component (4) connected to adjustable axles on each of the first and the second piston machines such that the adjustable axles are simultaneously adjusted by movement of the common component (4);
   wherein a common component adjuster facilitates adjustment of a position of the common component (4) into first and second positions, and
      in the first position of the common component (4), the first hydraulic piston machine (1) is adjusted to one of a small and a zero swept volume and the second hydraulic piston machine (2) is adjusted to one of a large and a maximum swept volume, and,
      in the second position of the common component (4), the first hydraulic piston machine (1) is adjusted to one of a large and a maximum swept volume and the second hydraulic piston machine (2) is adjusted to one of a small and a minimum swept volume;
   depending on an input from a first manual input device (10), the common component (4) is adjusted in one of a direction toward the first position and in a direction toward the second position;
   independently of the manual input (10), the common component (4) is adjusted, in the direction toward the first position if a predefined pressure is exceed in one of the working lines (3);
   an additional manual input device (22) is provided; and
   when the additional manual input device (22) is actuated, the common component (4) is adjusted in the direction toward the first position as a function of both a pressure in the working lines (3) and the actuation of the additional manual input device (22) such that with an unchanged actuation of the manual input device (10) and with actuation of the additional manual input device (22), the common component (4) is adjusted in the direction of the first position at a lower pressure in the working lines (3) than in a case of the additional manual input device (22) being un-actuated.

2. The adjusting device of claim 1, wherein the common component adjuster is configured as a hydraulic cylinder (5) which, in a basic position, retains the common component (4) in the first position and, when pressurized, adjusts the common component (4) in the direction toward the second position.

3. The adjusting device of claim 2, wherein a valve (12) is arranged upstream of the hydraulic cylinder (5), the hydraulic cylinder (5) is connectable, via a basic position of the valve (12), depending upon the manual input device (10), to one of a pressurizing medium source (6) and a pressurizing medium reservoir (7), and, in an additional position, the valve (12) connects the hydraulic cylinder (5) to a pressurizing medium reservoir (7) whereby the common component (4) is adjusted, independently from the manual input (10), in the direction toward the first position.

4. The adjusting device of claim 3, wherein a pressure of one of the working lines (3) acts on the valve (12) in order to adjust the valve (12) from the basic position to the additional position.

5. The adjusting device of claim 4, wherein an additional pressure, which can be adjusted by the additional manual input device (22), is superimposed on the pressure of the working lines (3), which acts on the valve (12) so that the valve (12) is already rerouted into the additional position when the working lines (3) have a lower pressure during the superimposition of the additional pressure.

6. The adjusting device of claim 5, wherein the valve (12) is provided with a first pressurizable area (19) and a second pressurizable area (17) and can be adjusted against force of a spring (14), and the valve (12) is adjusted from the basic position to the additional position, against the force of the spring (14), when pressure acts on at least one of the first and the second pressurizable areas (17, 19), the first area (19) is connectable to a pressurizing medium from a pressurizing medium source (6) via the additional manual input device (22), and the second area (17) is connectable to the pressurizing medium from the working line (3), which has the higher pressure than the pressurizing medium from a pressurizing medium source (6).

7. The adjusting device of claim 2, wherein the common component adjuster is a hydraulic cylinder (5).

8. The adjusting device of claim 6, wherein the first pressurizable area (19) is larger than the second pressurizable area (17).

9. The adjusting device of claim 1, wherein the first piston machine (1) and the second piston machine (2) are arranged in a hydrostatic mechanical power split transmission with a hydraulic and a mechanical branch, and the hydraulic branch is connected to the first piston machine (1) and the second piston machine (2).

10. A device for adjusting a swept volume of hydraulic first and second piston machines of bent-axis design,
   wherein the first piston machine (1) is arranged adjacent to the second piston machine (2),
   both piston machines have working lines (3) via which the first and the second piston machines are hydraulically connected with one another,
   the first and the second piston machines are provided with adjustable axles which are connected, via a common component (4), in such a way that the adjustable axles are simultaneously adjusted by movement of the common component (4) via a common component adjusting element (5),
      in the first adjusted position of the common component (4), the first hydraulic piston machine (1) is adjusted to a small or zero swept volume and the second hydraulic piston machine (2) is adjusted to a large or maximum swept volume, and
      in a second position of the common component (4), the first hydraulic piston machine (1) is adjusted to a large or maximum swept volume and the second hydraulic piston machine (2) is adjusted to a small or minimum swept volume,
   the common component (4) is adjusted as a function of a manual input device (10), either in a direction toward the first position or the second position, and, if a predefined pressure is exceed in one of the working lines (3), the common component (4) is adjusted in a direction toward the first position independently of the manual input device (10),
   a further manual input device (22) is capable of adjusting the common component (4), in the direction of the first position, as a function of both a pressure in the working lines and actuation of the further manual input device (22) such that, in a case of both an unchanged actuation of the manual input device (10) and an actuated further manual input device (22), the common component (4) is adjusted in the direction of the first position at a lower pressure in the working lines (3) than in the case of the further manual input device (22) being un-actuated.

11. A device for adjusting a swept volume of a hydraulic piston machine of a transverse axis design comprising:
   a first piston machine (1) arranged adjacent to a second piston machine (2),
   working lines (3) hydraulically connecting the first and the second piston machines to one another, and
   a common component (4) connected to adjustable axles on each of the first and the second piston machines such that the adjustable axles are simultaneously adjusted by movement of the common component (4);
   wherein a common component adjuster facilitates adjustment of a position of the common component (4) into first and second positions, and
      in the first position of the common component (4), the first hydraulic piston machine (1) is adjusted to one of a small and a zero swept volume and the second hydraulic piston machine (2) is adjusted to one of a large and a maximum swept volume, and,
      in the second position of the common component (4), the first hydraulic piston machine (1) is adjusted to one of a large and a maximum swept volume and the second hydraulic piston machine (2) is adjusted to one of a small and a minimum swept volume;
   depending on an input from a first manual input device (10), the common component (4) is adjusted in one of a direction toward the first position and in a direction toward the second position;
   independently of the manual input (10), the common component (4) is adjusted in the direction toward the first position if a predefined pressure is exceed in one of the working lines (3);
   an additional manual input device (22) is provided; and
   when the additional manual input device (22) is actuated, the common component (4) is adjusted in the direction toward the first position as a function of both a pressure in the working lines (3) and the actuation of the additional manual input device (22) such that with an unchanged actuation of the manual input device (10) and with actuation of the additional manual input device (22), the common component (4) is adjusted in the direction of the first position at a lower pressure in the working lines (3) than in a case of the additional manual input device (22) being un-actuated; and
   the common component adjuster is a hydraulic cylinder (5), and hydraulic fluid from a pressure medium source must pass through at least two valves (10, 12) before reaching the hydraulic cylinder (5).

* * * * *